Sept. 13, 1938.     K. E. WHITNEY ET AL     2,130,111
SCREW AND BOLT DRIVING AND NUT RUNNING MACHINE
Filed Aug. 6, 1934     2 Sheets-Sheet 2

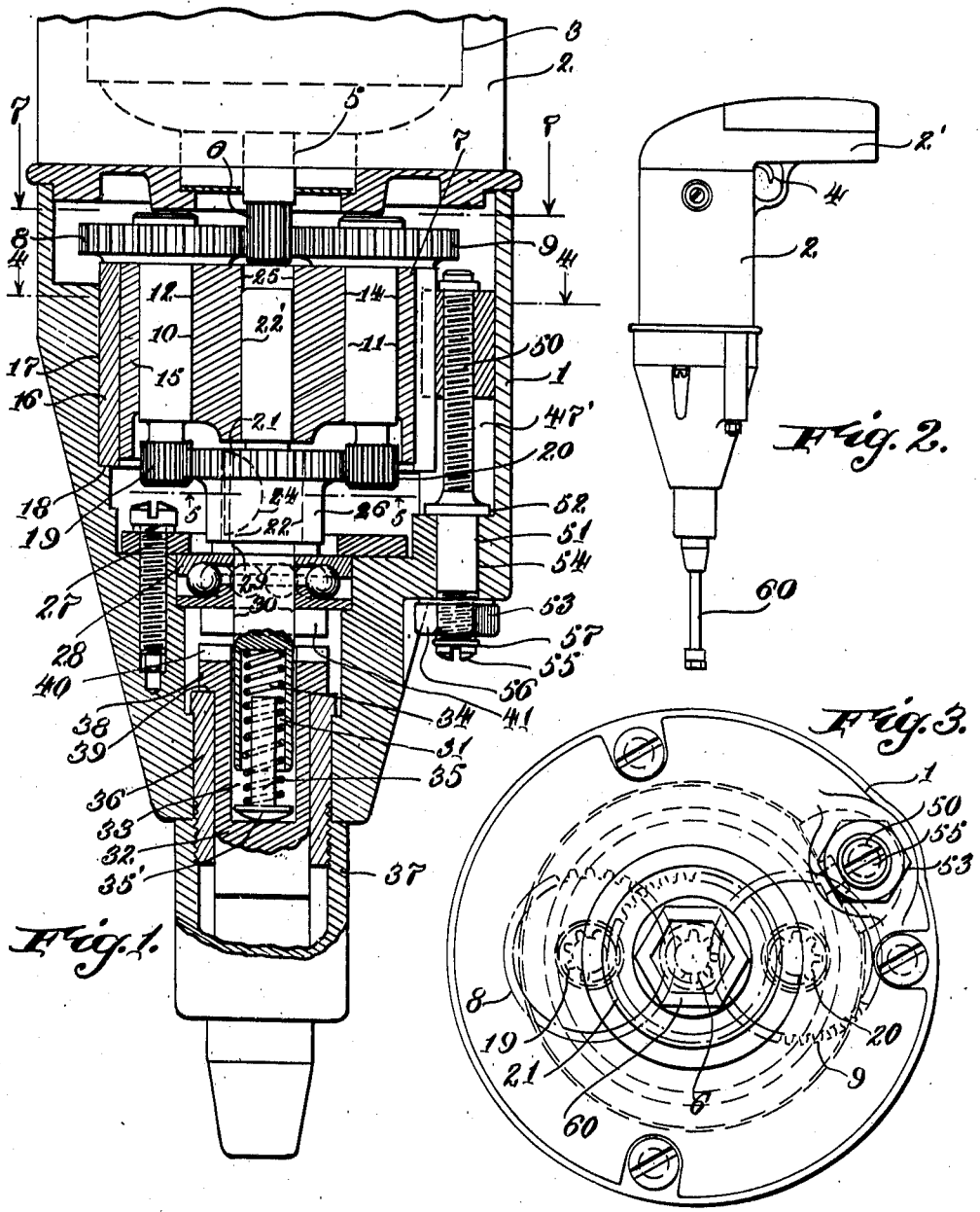

Patented Sept. 13, 1938

2,130,111

UNITED STATES PATENT OFFICE 2,130,111

SCREW AND BOLT DRIVING AND NUT RUNNING MACHINE

Kenneth E. Whitney, Baltimore, and Alonzo G. Decker, Towson, Md., assignors to The Black & Decker Manufacturing Company, a corporation of Maryland Application August 6, 1934, Serial No. 738,670

8 Claims. (Cl. 81—57)

The invention relates to an improvement in screw and bolt driving and nut running which is adaptable in the form shown to the portable power driven hand controlled type of machine, providing an improved drive with an adjustable torque limitation whereby the maximum torque applied to the spindle which carries the screw driver bit or wrench is limited so that a screw or a nut or bolt can be driven or set to a point where it presents a predetermined resistance to further driving or setting.

Various screw driving and bolt setting and nut running tools are in use, and in a large proportion of these there is a release which is accomplished by means of a jaw clutch having teeth with inclined surfaces which slip one past the other in releasing. The engaging and disengaging action of the clutch takes place in the direction of the tool axis. Some of these clutches are held in engagement by spring pressure and others by the pressure of the tool against the work, but in most of them there is a tendency of the clutch teeth to release and reengage repeatedly at the end of the driving operation when the desired set of the screw nut or bolt is reached which results in a vibratory shock to the workman as the tool kicks backwardly on the disengagement and reengagement of the jaw clutch and even where there is no reengagement the shock of disengagement is considerable. This is found to so tire the operator that it is difficult for him to perform a full day's work at screw driving and bolt setting and nut running with the old machines at full efficiency and top speed. This shock tends to disfigure the work and is communicated backwardly through the tool having a tendency to shear the keys and reduce the length of life of other driving connections which thus receive repeated shocks and vibrations tending to crystallize the metal in a comparatively short time. Also the tendency to break and deform the teeth of the jaw clutch is excessive and only partially overcome by the provision of the hardest, toughest and most expensive material at this point. These various difficulties and defects have been overcome by the provision of the improvement which is the subject of the invention.

Objects of the invention are to provide an improved form of limited torque driving connection for use in a portable electric or other tool for driving screws, nuts and bolts which is so arranged that the torque at which the drive is discontinued may be quickly adjusted at the will of the operator to suit the work, i. e., the size of nut, screw or bolt and the tension at which it is to be set, and the release takes place automatically at a uniform accurately predetermined torque.

In the operation of the preferred form of tool there is no vibrating action at all, but a smooth gradual release. This construction contributes to the length of life of the tool and to the ease of operation so that the life of the tool is increased and the operator is not subject to the weariness and loss of efficiency which is incident to the operation of the prior art tools and the work is not disfigured. In another form of tool a tangential hammering action is performed on the work at the will of the operator.

In the accompanying drawings we have illustrated a portable power driven tool embodying the features of the invention in the preferred form.

In the drawings:

Figure 1 is a fragmentary section on the axis of the spindle, the same being taken through the gear casing and through the spindle housing or nose, the lower portion of which with the chuck is shown in elevation.

Figure 2 is an assembly view of the entire tool in the nature of an elevation on a reduced scale.

Figure 3 is a bottom plan view.

Figure 6:
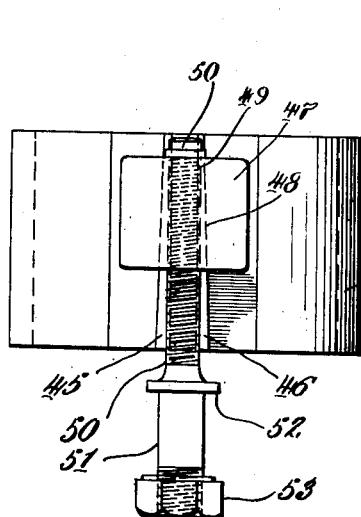
Figure 6 is an elevation of the adjusting sleeve and the cooperating parts which are shown in plan in Figure 5, the view being taken in the direction of the arrow in Figure 5.
Figure 4:
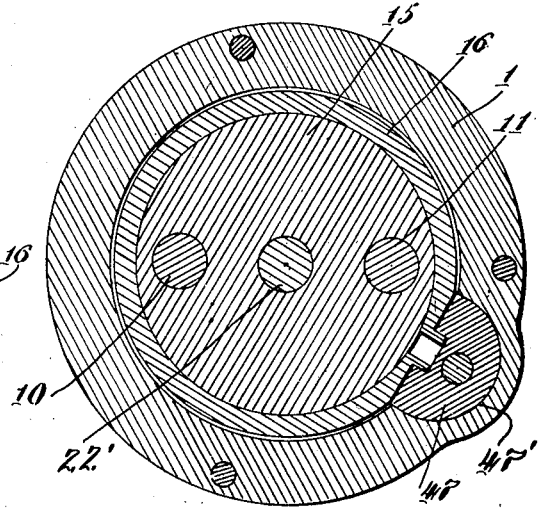
Figure 4 is a section on the line 4, 4 of Figure 1 looking downwardly.

Referring to the drawings by numerals, each of which is used to indicate the same or similar parts in the different figures, the construction shown comprises a gear casing 1, to which is attached at the upper end by screws 1' or in any suitable manner, a motor housing 2 containing an electric motor 3 indicated in dotted lines. This may be of a reversible type or otherwise equipped for reversal of the drive. At the upper end of the motor housing 2 there is a handle 2' of any suitable design equipped with any suitable switch lever 4, switch not shown, for use in controlling the operation of the motor, it being understood that any convenient source of power may be used. The motor shaft 5 is provided with a pinion 6 mounted thereon and secured thereto. This pinion 6 drives a planetary train of gearing 7 which in the form of the invention shown includes two or any suitable number of toothed orbital gears 8 and 9, both of which mesh with the pinion and are driven thereby. As shown, they are mounted each on one of a corresponding number of short shafts 10 and 11. These shafts are mounted in eccentrically located bearings 12 and 14 in a cylindrical rotary carrier block 15 which is encircled by a split sleeve 16 which is in turn mounted in a suitable seat 17 in the casing 1. This seat terminates at the bottom in a peripheral shoulder 18 in the casing 1 on which the split sleeve 16 rests. The shafts 10 and 11 which are parallel to the axis of the tool are provided at their respective lower ends below the carrier 15, with orbital pinions 19 and 20 secured to the respective shafts to rotate therewith, and the gears 8 and 9 which are on top of the carrier 15, are secured to the upper ends of these respective shafts 10 and 11 in driving relation thereto. The pinions 19 and 20 mesh with a tool shaft gear 21 mounted on the planetary shaft 22 and keyed thereto by a key 24 or secured in any suitable manner. The planetary shaft 22 at its upper end extends upwardly into the carrier 15 which has a bearing 25 in line with its axis to receive it, the shaft end 22' being mounted to rotate freely in the bearing thus provided. The carrier 15 rotates about shaft 22 and shaft 22 rotates in the carrier depending on the tension of the sleeve 16 and the resistance at the tool. The gear 21 has a hub 26 which projects downwardly and bears at its lower end on a shoulder 29 which in turn rests on a ball thrust bearing 28 concentric with the axis of the tool and held in position by washer 27. These and other details may be designed and varied to suit the conditions presented.

In the form shown the lower reduced end 30 of the planetary shaft 22 is hollow at 31 and that portion projects into the upper end of the spindle 32 which has an opening at 33 to receive it. The hollow end 31 of the tool shaft contains a coiled spring 34 which is coiled about a pin 35 in said hollow, bearing at one end against the head 35 of the pin and at the other end against the end of the hollow 31 at the top. The head 35' of the pin 35 at its lower end rests on the bottom of the hollow 33 in the spindle. The spindle 32 is mounted in a suitable bearing sleeve 36 secured in the lower end of the casing, the same projecting beyond the casing into the nose or chuck housing 37 which is threaded onto the sleeve. The upper end of the spindle at 38 is of greater diameter than the portion within the bearing, being shouldered at 39 to rest on top of the bearing sleeve, and this upper enlarged end 38 is provided with a slotted jaw clutch member 40 which cooperates with a jaw clutch tooth shown in the form of a transverse bar 41 carried by the lower end portion 30 of the tool shaft 22 below the thrust bearing 28. The spindle 32 is mounted to slide in the bearing 36 upwardly from the position in which it is shown, being normally depressed by the spring 34 so that on engagement with the work the spindle is moved upwardly against the tension of the spring, bringing the jaw clutch 40, 41 into engagement. At other times the spindle is free to rotate independently of the gearing in order that it may be brought easily into engagement with the work at the desired angle of rotation about its axis. The spindle may be mounted and operated in any suitable manner to suit the conditions presented, the jaw clutch being nonessential to the broader conception of the invention.

When the carrier 15 is free to rotate, assuming that sleeve 16 is open, the operation of the motor rotates the pinion 6 which drives the orbital gears 8 and 9, and the orbital pinions 19 and 20 in rotation. Under these conditions the carrier 15 rotates, the gears 8 and 9 roll about pinion 6 and the pinions, 19, 20 roll about the drive shaft gear 21 without rotating it, there being at all times a slight resistance to rotation of the spindle or it may be assumed that the spindle is held against rotation. Gears 8, 9 and pinions 19 and 20 are referred to herein as orbital gear members.

Figure 5:
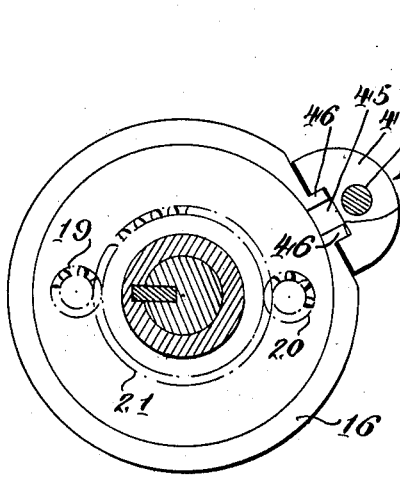
Figure 5 is a section on the line 5, 5, Figure 1, looking upwardly.
Figure 7:
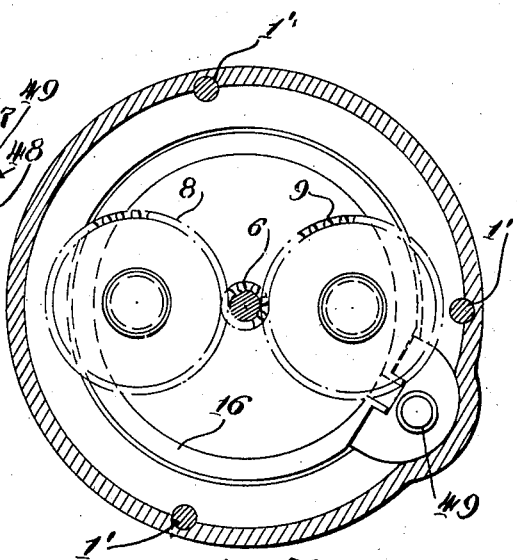
Figure 7 is a section on the line 7, 7 in Figure 1 looking downwardly.

To give an adjustment to the predetermined driving torque, the sleeve 16 is adjustable as to its diameter, being shown as split in the direction of its axis as described and as best shown in Figures 5 and 6, the split being indicated by reference character 45. At the sides of the split, lugs 46 have been provided. These extend along the edges of the split, being most conveniently machined on the outside of the sleeve. The lugs converge as to their outside surfaces providing a split wedge which as shown is of increasing external width toward the bottom. Cooperating with these lugs is a sliding closing member or block 47 having a slot 48 in one surface and preferably of a taper corresponding to the taper of the lugs 46 so that it fits and slides easily thereon to close the wedge, hence closing the sleeve 16 with the desired degree of tension, giving the desired degree of friction applied to the cylindrical outer surface of the carrier 15. This gives a predetermined resistancy to rotation of the carrier which may be applied in any suitable manner, the form disclosed being the preferred form.

The closing member 47 is provided with a threaded hole 49 also parallel to the axis which hole is engaged by an actuating member 50 in the form of a screw having a swivel shaft portion 51 with a shoulder 52 at one end and adjusting means 53 at the other end, whereby the screw may be rotated and locked. This screw as shown in Figure 1 has the swivel portion or shaft 51 fitting in a bearing 54 at the lower side of the gear housing, the end of the screw with the adjustment 53 projecting from the bottom of the housing. As shown, the screw 50 has a screw driver slot 55 by which it may be turned to the desired adjustment and a lock nut 56 which is held in position to prevent loss by a spring ring 57 or other suitable clip. The closing block or member 47 slides in a guide or way 47' in the housing which prevents rotation of the sleeve with the carrier 15.

In the operation of the machine in the preferred form, Figures 1 to 7, reference is first had to the operation to be performed, i. e., whether the tool is to be used in driving screws or bolts or setting nuts, the size of the screw bolt or nut and hence the maximum torque which must be exerted in setting them to the desired degree. If, as is the general practice, a number of small screws and nuts or bolts are to be driven and/or set, the desired torque may be determined experimentally by turning the screw 50 to move the closing member or block 47 to a point at which the split sleeve 16 is so closed as to apply a degree of friction to the carrier 15 which seems to be correct for the purpose in hand preferably giving a little less than the desired torque, and a single operation is then performed. Assuming that setting takes place to a little less than the desired torque, the screw 50 is turned in a right handed direction to further lower the closing member or bolt 47, further closing the sleeve 16 to a slight degree and increasing the friction applied to the carrier 15 to a corresponding degree. The screw nut or bolt is then further set in accordance with the well known operation of such tools and if the torque is not as desired, the screw 50 is further turned to move the closing member or block 47 up or down to increase or decrease the torque, as may be necessary. When the desired adjustment is reached, the nut 53 is tightened to hold the adjustment.

In the driving or setting operation the spindle 32 in the form described being normally free to rotate is turned until the bit 60 is in the correct angular position to engage the work. At the time the engagement is accomplished and the tool being pressed downwardly against the work, the jaw clutch 40, 41 is engaged, the switch 4 being closed to rotate the motor and simultaneously with the application of pressure of the work, the rotation of the motor is transmitted directly to the drive pinion 6 and hence to the eccentrically located orbital gears 8 and 9, which being held in position by the friction of the sleeve 16, holding the carrier 15 stationary, due to the anchoring of the closing block 47 in its guideway 47' the rotation of the gears 8 and 9 is transmitted through the shafts 10 and 11 to the orbital pinions 19, 20, which by their engagement with the tool shaft gear 21 drive the planetary shaft in rotation at a speed determined by the reducing ratio of the pinion 6 to the gears 8, and 9 and pinions 19 and 20 to the gear 21. The gears 8 and 9 and pinions 19 and 20 are referred to in a general way as orbital gears or gear members. The rotation of the tool shaft 22 is transmitted directly to the spindle through the clutch 40, 41, provided a clutch is employed, and hence to the work by way of the bit 60, which may be a screw driver or wrench in correspondence with the work being done. The driving of the screw, nut or bolt is thus progressed until the setting operation has been completed in accordance with the adjustment previously determined.

In this way a predetermined set of the screw, nut or bolt is obtained automatically in accordance with the adjustment and at the end of the operation there is a smooth even release without vibration or shock to the workman or to the working parts and without reengagement.

Important features of the invention and advantages resulting therefrom are believed to reside in the provision for accurate adjustment of the maximum torque applied to the work whereby an exactly uniform predetermined set of the screws, nuts or bolts is obtained and the chance of injury to the work is eliminated, also the tendency to tire the operative is greatly reduced in the use of this tool as compared to the use of other tools of this type. This latter effect is due to the fact that there is a complete absence of vibration in the direction of the axis and of upward thrust on the release and hence a complete absence of shock to the operator. This absence of shock and vibration is also helpful in preventing injury to the working parts, keys, etc.

The quickness and simplicity of the adjustment of the torque to suit the size of the screw, nut or bolt to be driven and the convenience of the same are of particular importance.

We have thus described specifically and in detail a screw driving, nut running and bolt setting tool embodying the features of our invention in the preferred form in order that the manner of constructing, applying, operating and using the same may be fully understood, however, the specific terms herein are used descriptively rather than in a limiting sense, the scope of the invention being defined in the claims.

What we claim as new and desire to secure by Letters Patent is:

1. The combination in a manually portable power driven tool for driving screws and bolts and running nuts of a rotary driving source, a planetary shaft, a spindle, planetary gearing operated from said drive to drive the planetary shaft, the planetary gearing comprising a rotary carrier, orbital gear members thereon connected to said drive and to said planetary shaft to drive the planetary shaft and spindle from said source when the carrier is stationary and to rotate about the carrier axis without driving when the planetary shaft is stationary, an overload releasing means for preventing rotation of said carrier up to a point of maximum torque, to determine the extent to which the screws, nuts or bolts are to be set, a casing from which the spindle projects, the remainder of said parts being enclosed within the casing, and means within the casing for adjusting said overload releasing means to determine said maximum torque and means engageable from outside the casing for operating said adjustment.

2. The combination in a portable power driven tool for driving screws and bolts and running nuts of a rotary drive, a planetary shaft, a spindle connected to said planetary shaft to be driven thereby, planetary gearing operated from said rotary drive to drive the spindle, the planetary gearing comprising a rotary carrier and orbital gear members positioned eccentrically thereon, adjustable means for checking rotation of said carrier to cause the spindle to be driven by the planetary gearing up to a point of maximum torque release to determine the torque to which the screws, nuts or bolts are to be set, said checking means comprising a brake and a wedge operable in the direction of the spindle axis for applying the brake.

3. The combination in a portable power driven tool for driving screws and bolts and running nuts of a rotary drive, a spindle, planetary gearing operated from said rotary drive to drive the spindle, the planetary gearing comprising a rotary carrier and means for preventing rotation of said carrier, up to a point of maximum torque to determine the torque to which the screws, nuts or bolts are to be driven prior to the release of the planetary mechanism whereby its driving action is terminated, said means for preventing rotation of the carrier comprising a brake engaging the carrier and a screw arranged in the direction of the spindle axis and means moved thereby in substantially the same direction for operating the brake.

4. In a portable power driven rotary tool a spindle, a source of rotary motion, means for communicating torque from said source of rotary motion to the spindle and releasing said torque at a predetermined intensity comprising a planetary shaft, planetary gearing comprising a rotary carrier in the form of a cylinder mounted to rotate about said planetary shaft, the upper portion of which shaft has a bearing in said carrier, a motor having a shaft, a pinion thereon concentric with the carrier at the top of the same, orbital gears positioned eccentrically on the top of the carrier and meshing with said pinion, each said gear having a shaft extending downwardly through said carrier parallel to the axis, a pinion on the lower end of each said shaft and a gear on the planetary shaft concentric with the carrier and engaged by said pinion, the planetary gearing being adapted when the carrier is stationary to drive the spindle at a definite speed and when the carrier rotates at full speed to transmit no motion to the spindle, and means for applying an adjustable resistance to the rotation of the carrier to determine the torque applied to the spindle and planetary shaft and to the work and to provide a fixed torque at which the driving operation is terminated by the rotation of the carrier and consequent cessation of rotary motion of the spindle and planetary shaft.

5. In a portable power driven rotary tool, a spindle, a source of rotary motion, means for communicating torque from said source of rotary motion to the spindle and releasing said torque at a predetermined intensity comprising a planetary shaft, planetary gearing for communicating rotary motion from said source to said spindle, said planetary gearing comprising a rotary carrier and gear members eccentrically thereon, a casing in which all of said construction is enclosed, the planetary gearing being adapted to operate when the carrier is stationary to drive the spindle at a definite speed and when the carrier rotates at full speed to transmit no motion to the spindle, and means within the casing, having a device engageable from outside the casing for operating the same for applying a resistance to the rotation of the carrier to determine the torque applied to the planetary shaft and to the work and to provide a predetermined torque at which the driving operation is terminated by the rotation of the carrier and consequent cessation of rotary motion of the planetary shaft and a normally released jaw clutch connecting the spindle to the planetary gearing, being adapted for engagement by pressure of the tool against the work.

6. In a portable power driven rotary tool for running nuts and driving screws and bolts and the like, a source of rotary motion, means for communicating torque from said rotary source to the work and releasing said torque at a predetermined intensity comprising a planetary shaft, a planetary gearing for communicating rotary motion from said source to said planetary shaft, said planetary gearing comprising a rotary carrier mounted for rotation in said casing about the axis of said shaft, the source of rotary motion having a shaft with a pinion thereon rotating about said axis, orbital gears at one end of the carrier meshing with said pinion and having shafts extending through said carrier parallel to said axis and orbital pinions on said shafts on the opposite end of the carrier from said gears, and a gear on the tool shaft engaged and driven by said orbital pinions and means engaging the periphery of said carrier between said orbital gears and orbital pinions for applying resistance to the rotation of the carrier to determine the torque applied to the tool shaft and to the work and to provide a predetermined torque at which the driving operation is terminated by the rotation of the carrier and consequent cessation of rotary motion of the planetary shaft, a tool spindle having a normally released jaw clutch connection to said planetary shaft to provide for free rotation of the spindle to give the desired angle of engagement with the work, said jaw clutch being engaged by pressure of the tool against the work.

7. In a portable power driven rotary tool, a rotary driving source, a pinion driven thereby, a planetary gear operated by said pinion, said planetary gear comprising an orbital gear having a shaft, a rotary carrier on which said shaft is positioned eccentrically, a pinion on said shaft, a planetary shaft having a gear secured thereto and engaged by said pinion, nonpositive means engaging the carrier for checking the rotation of said carrier, and means for varying the intensity of said engagement, to determine the maximum torque to be applied to the planetary shaft, said respective means comprising an anchored split tension member encircling the carrier and a split wedge having one part on each side of said split and a closing member engaging said split wedge to close the tension member and determine the intensity of engagement of the tension member with the carrier and the torque applied to the planetary shaft, and means for forcing said closing member into a plurality of positions of progressive engagement of said member with said wedge to close the split therein.

8. The combination in a portable power driven rotary tool for driving screws, bolts, nuts and the like of a source of rotary driving torque, a planetary shaft and planetary gearing for transmitting the driving torque from said source to said planetary shaft, said planetary gear comprising a pinion driven from said source of driving torque, a rotary carrier, an orbital gear driven by said pinion and positioned eccentrically on the carrier, a pinion carried by said gear and positioned eccentrically on said carrier, a gear on said planetary shaft driven by said pinion, a split sleeve encircling the carrier, means for anchoring the sleeve, means for varying progressively the tension of said sleeve on said carrier by closing the split in varying degrees to check and stop the rotation of the carrier up to a predetermined torque of the tool shaft beyond which tension it is permitted to rotate.

KENNETH E. WHITNEY.
ALONZO G. DECKER.